Jan. 18, 1927.

H. H. BOWMAN

GAS VALVE SAFETY ATTACHMENT

Filed April 1, 1926

1,615,004

Inventor
Herbert H. Bowman

Patented Jan. 18, 1927.

1,615,004

UNITED STATES PATENT OFFICE.

HERBERT HARVEY BOWMAN, OF TORONTO, ONTARIO, CANADA.

GAS-VALVE SAFETY ATTACHMENT.

Application filed April 1, 1926. Serial No. 99,176.

My invention relates to a safety device adapted to be attached to any gas heating appliance, especially domestic gas ranges, by which the flow of gas to the heating unit is controlled by a valve or valves.

The device is adapted to be detachably secured in any convenient manner, adjacently and over the valves, and which will require certain adjustments before a valve can be opened or closed to control the flow of gas.

The device is constructed and arranged in relation with the valves, that it will prevent accidental opening or closing of the valves by any moving object coming in contact with the valve handles.

The object of the device is to provide a safety device to engage in relation and over the gas control valves, that will require certain adjustments, before the valves may be opened or closed, that will position over the valves to protect the valves from accidental opening or closing, and that will automatically close and lock itself in normal position after it has been adjusted to open or close the valves.

In the drawings:—

Like letters of reference refer to like parts throughout the drawings.

Figure 1:
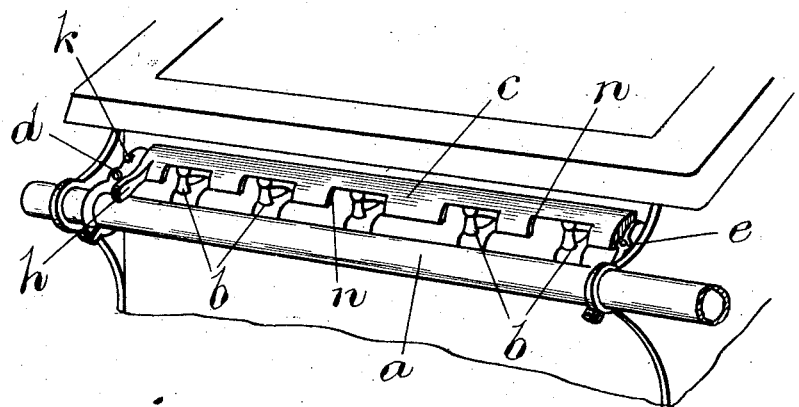
Figure 1 is a perspective view of a portion of a gas range showing the device attached to the manifold with the valves closed.
Figures 2, 3:
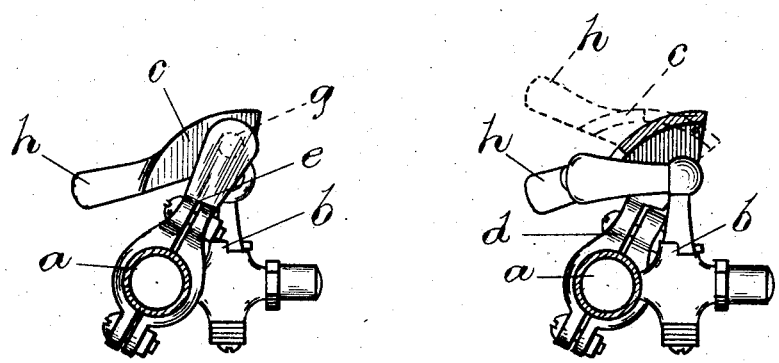
Figure 2 is an end elevational view showing the device in normal position with the valves closed.
Figure 3 is an end elevational view partially in section showing the valves open, and showing by dotted lines the guard-bar adjusted to permit adjustment of the valves.
Figures 4, 5:
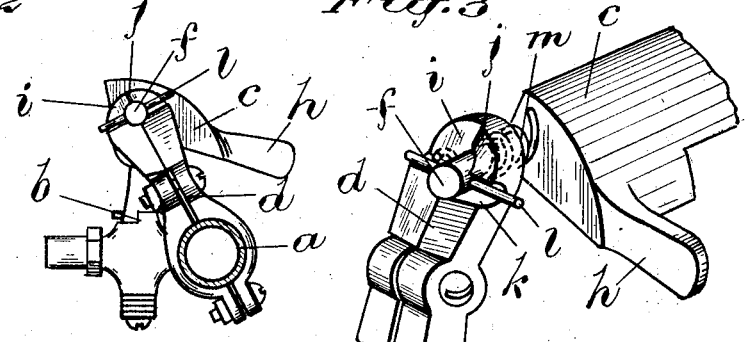
Figure 4 is an end elevational view showing the bracket and means for closing and locking the bar.
Figure 5 is a detail perspective view of the bracket and means for automatically closing and locking the guard-bar.

Pivotally supported on the gas manifold $a$ and positioned to engage over the gas valves $b$, extending therefrom, is a guard-bar $c$. The guard-bar is adapted to engage over the valves in such relation that the valves may not be adjusted, that is opened or closed, without first raising the guard-bar to get at the handles of the valves.

The guard-bar $c$ is pivotally supported and detachably secured to the gas manifold by brackets $d$ and $e$. Formed with and projecting from the ends of the guard-bar are pintles $f$ and $g$. The pintles engage in pivotal relation in the brackets, by which the guard-bar may be raised or tilted upwardly, to enable the operator to get at the valves, to turn the handles to make the necessary adjustments to control the flow of gas, that is open or close the valves.

Formed on one end of the guard-bar and projecting outwardly therefrom, is a lever handle $h$ to facilitate in raising the bar for the purpose of exposing the valves to get at them for opening or closing.

The bracket $d$ is slightly different in construction than the bracket $e$, besides supporting the guard-bar $c$ in pivotal relation it functions as a lock, and means for automatically returning the bar to its normal position, after having been raised to open or close the valves.

Formed in the head of the bracket $d$ is a recessed portion $i$ and a cam projection $j$, in conjunction with a locking notch $k$.

The pintle $f$ projects out through the head of the bracket $d$, and passing through the end of the pintle at right angles, is a locking pin $l$, which when the guard-bar $c$ is in its normal position rests in the notch $k$.

To raise the guard-bar $c$, it is first necessary to adjust it laterally, or towards the bracket $d$, to disengage the pin $l$ from the notch $k$. The bar may then be raised or tilted backwardly by the aid of the lever handle $h$, and as the bar is being raised, the pin $l$ rides over the cam $j$, into the recessed portion $i$, where it may be held in this position by the operator, to expose the valves and valve handles free from the guard-bar, that they may be opened or closed as the case may be.

When the operator has adjusted the valves he may by hand action return the bar to its normal position, or he may just relax his hold, and the bar will return or drop back into normal position by overbalance, and the action of the torsion spring $m$, coiled on the pintle $f$, and interposed between the head of the bracket and the end of the guard-bar, one end of the spring $m$ being hooked into the end of the guard-bar, and the other end being hooked into the head of the bracket.

Formed in the lower edge of the guard-bar $c$ are a series of notches $n$, corresponding in location with the position of the valves, to permit free action of the valve-handles, when the valves are opened, to allow for slight adjustments of the handles without having to raise the guard-bar.

The notches $n$ are sufficiently wide that the handles of the valves may be adjusted in either direction, to change the gas flow, without having to raise the guard-bar on each occasion.

When the guard-bar $c$ is in its normal position, and the valves closed, it sets closely over the valves, which prevents them being adjusted without completely raising the bar, by the proper method, but when the valves are open, slight adjustments may be made to the valve handles, to increase or decrease the flow of gas, without raising the guard-bar, but in this position, the valves may not be accidently opened or closed, by objects coming into contact with the valve handles.

Various modifications may be made in the design and method of attaching the guard-bar to the gas manifold, in conjunction with the valves, without deviating from the nature of my invention.

What I claim as new and desire to secure by Letters Patent, is:—

In a gas valve safety attachment, a guard-bar pivotally and adjustably supported and adapted to engage over the valves, notches formed in the lower front edge of the said guard-bar, pintles formed on the ends of the said guard-bar, said pintles engaging in supporting brackets, a locking notch formed in one of said brackets, a locking pin projecting from said pintle, a torsion spring interposed in between one end of said guard-bar and the adjacent bracket, the ends of said spring being secured respectively into the end of the said guard-bar and the head of said bracket, said spring adapted to return said guard-bar to its normal and locked position after having been tilted to open and close the said valves, as and for the purpose specified.

Signed at Toronto, this 29th day of March, 1926.

HERBERT H. BOWMAN.